United States Patent [19]

Parks et al.

[11] Patent Number: 5,640,517
[45] Date of Patent: Jun. 17, 1997

[54] METHOD AND APPARATUS FOR MASTERS TO COMMAND A SLAVE WHETHER TO TRANSFER DATA IN A SEQUENTIAL OR NON-SEQUENTIAL BURST ORDER

[75] Inventors: Terry J. Parks, Round Rock; Darius D. Gaskins, Austin, both of Tex.

[73] Assignee: Dell USA, L.P., Austin, Tex.

[21] Appl. No.: 607,051

[22] Filed: Feb. 26, 1996

Related U.S. Application Data

[63] Continuation of Ser. No. 81,925, Jun. 22, 1993, abandoned.
[51] Int. Cl.⁶ ........................................ G06F 13/00
[52] U.S. Cl. .................. 395/285; 395/290; 395/831; 395/834
[58] Field of Search ................... 395/200.1, 823, 395/824, 828, 831, 834, 853, 854, 855, 284, 285, 500, 800, 883, 290

[56] References Cited

U.S. PATENT DOCUMENTS

| | | | |
|---|---|---|---|
| 3,886,524 | 5/1975 | Appert | 395/290 |
| 4,346,452 | 8/1982 | Groves | 395/831 |
| 4,534,011 | 8/1985 | Andrews et al. | 395/250 |
| 4,608,689 | 8/1986 | Sato | 395/200.1 |
| 4,688,170 | 8/1987 | Waite | 395/500 |
| 4,734,853 | 3/1988 | Nakano | 395/831 |
| 4,817,037 | 3/1989 | Hoffman et al. | 395/290 |
| 4,855,905 | 8/1989 | Estrada et al. | 395/500 |
| 4,890,224 | 12/1989 | Fremont | 395/831 |
| 4,954,983 | 9/1990 | Klingman | 395/831 |
| 5,065,314 | 11/1991 | Masnovzak | 395/831 |
| 5,140,680 | 8/1992 | Best | 395/290 |
| 5,150,465 | 9/1992 | Bush et al. | 395/834 |
| 5,165,022 | 11/1992 | Erhard | 395/883 |
| 5,175,820 | 12/1992 | Gephardt | 395/834 |
| 5,297,292 | 3/1994 | Morimoto et al. | 395/293 |
| 5,345,562 | 9/1994 | Chen | 395/290 |
| 5,349,649 | 9/1994 | Iijima | 395/200.1 |
| 5,359,709 | 10/1994 | Blane et al. | 375/222 |
| 5,367,655 | 11/1994 | Grossman et al. | 365/230.03 |
| 5,396,606 | 3/1995 | Grieb et al. | 395/421.01 |
| 5,410,656 | 4/1995 | King et al. | 395/306 |
| 5,420,412 | 5/1995 | Kowalski | 235/492 |
| 5,506,602 | 4/1996 | Yonoyama | 345/132 |
| 5,506,965 | 4/1996 | Nade | 395/200.17 |

*Primary Examiner*—Lance L. Barry
*Attorney, Agent, or Firm*—Henry N. Garrana; Mark P. Kahler; Diana L. Roberts

[57] ABSTRACT

A bus with selective burst ordering enables the implementation of computer systems that incorporate bus masters (e.g., processors, DMA controllers, LAN controllers, etc.) with dissimilar burst orders. The same bus supports devices which require or prefer differing burst orders for high bandwidth data transfers. Selective burst order is enabled through the use of a bus line which may be asserted by the current bus master. By asserting the corresponding signal, a current bus master indicates that sequential (rather than non-sequential) burst order will be used for data transfer. Specialized burst address generation logic enables a bus slave to generate, in the selected burst order, the low order bits of memory addresses for the data words implicitly addressed during a burst transfer.

23 Claims, 4 Drawing Sheets

METHOD AND APPARATUS FOR MASTERS TO COMMAND A SLAVE WHETHER TO TRANSFER DATA IN A SEQUENTIAL OR NON-SEQUENTIAL BURST ORDER

This application is a continuation of application Ser. No. 08/018,925, filed Jun. 22, 1993 now abandoned.

BACKGROUND OF THE INVENTION

1. Field of the Invention

This invention relates to interfacing various subsystems of a computer system, and more particularly to memory buses which accommodate burst mode data transfers.

2. Description of the Relevant Art

Modern backplane buses typically support bursting where a single address phase is followed by a sequence of data phases. Because only the first address is provided by the bus master and multiple data words are transferred based on that single address, the bandwidth of bursted bus transfers is greater than single-word, explicitly addressed transfers. Two typical uses of burst mode transfers are cache line fills from memory and Direct Memory Access (DMA).

Implicit in any burst scheme is an address order for transfers of subsequent data. Coordinated data transfers are accomplished by prior agreement as to the burst order. All senders and all receivers of burst data must agree on this order. Typically, the burst order is determined by the requirements of the processor.

The most common order is sequential based on memory address. However, other orders are possible. For example, the widely used i486 microprocessor and the recently introduced PENTIUM microprocessor, both available from INTEL Corporation of Santa Clara, Calif., have architectures which use a burst order that varies depending on the address of the first data word accessed. Table 1 summarizes these burst order sequences, which are known as the i486 microprocessing burst order sequences. These sequences allow interleaved, DRAM-based memory systems to efficiently mask row and column address setup times for subsequent accesses, thereby maximizing data transfer bandwidth.

TABLE 1

|  | Access Begins With: | | | |
|---|---|---|---|---|
|  | First Word | Second Word | Third Word | Fourth Word |
| BURST ORDER (Word) | 0 | 1 | 2 | 3 |
|  | 1 | 0 | 3 | 2 |
|  | 2 | 3 | 0 | 1 |
|  | 3 | 2 | 1 | 0 |

Memory bus systems in which the burst order is established by prior agreement impose a performance disadvantage when used with certain bus masters such as direct memory access, or DMA, controllers, which naturally prefer a sequential burst order regardless of the first data word accessed. To exploit burst transfers from memory to the CPU (e.g., for cache line fills), a design which implements burst order sequences such as the i486 microprocessor burst sequences is required. Unfortunately, this limits the ability of certain other subsystems to exploit burst transfers. These other systems, which include DMA controllers and other processors or co-processors, require burst data in sequential address order.

The problem is best illustrated by a computer system which includes, for example, a Pentium microprocessor, a memory bus, an interleaved memory subsystem designed to support i486 microprocessor burst sequences, and a DMA controller. Because the i486 microprocessor burst order is a function of the initial data transfer address (see Table 1), the system burst order coincides with that desired by the DMA controller (i.e., sequential) only when the initial address is 4-word aligned (i.e., when the low order bits are 00). When, for example, the DMA controller initiates a transfer where the initial address is not 4-word aligned (i.e., when the low order bits are 01, 10, or 11), the transfer must be broken into separate transactions.

If the initial address of a data transfer from memory to a DMA device is not 4-word aligned (e.g., when the initial address is at address x01) data presented using the non-sequential addressing scheme of i486 microprocessor burst order is incompatible with the sequential burst order required by the DMA controller. One approach to avoiding this problem is to require the DMA controller to request data in multiple transactions. Unfortunately, this approach forgoes much of the bandwidth offered by burst mode, implicitly addressed transfers. First, the controller must explicitly request data at x01. Next, the controller must request either a short burst (x10 and x11) or two explicitly addressed transfers. Finally, the remainder of the data can be transferred in burst mode as it is 4-word aligned.

For large blocks of contiguous data this inefficiency could be amortized across many data words. However, for smaller blocks, data transfer bandwidth typically is significantly impaired. In addition to the bandwidth impairment, a system which supports only non-sequential burst order requires implementation of additional logic within the DMA subsystem to ensure compatibility. This requirement limits the opportunity for use of low-cost, existing DMA controllers which rely on sequential burst ordering.

Although the problem is best described in the context of the specific incompatibility between the i486 and Pentium type microprocessors and DMA controller burst orders, it is in fact generic to any conflict between burst order requirements of bus masters. Such a conflict might arise between two processors which require different burst ordering, between a processor and a DMA controller, between a processor and a LAN controller, etc. Current memory bus systems require that performance of one subsystem be sacrificed because only a single burst order is supported.

SUMMARY OF THE INVENTION

An advantage of the present invention is the resolution of burst order conflicts among bus masters without sacrificing the performance of any of the bus masters during burst transfers.

Another advantage of the present invention is facilitation of high bandwidth data transfers in computer systems which incorporate bus masters with dissimilar burst orders, such as microprocessors, DMA controllers, LAN controllers, and the like.

These and other advantages are realized in the present invention, which in one embodiment is a computer subsystem for supporting burst data transfers on a bus. First and second bus masters are connected to the bus. The first bus master has a first burst order protocol which includes non-sequential burst ordering, while the second bus master has a second burst order protocol which includes sequential burst ordering. A bus slave is connected to the bus and includes burst address logic connected to a control line. The control line is for carrying a burst protocol indicating signal indicating either the first burst order protocol or the second burst order protocol, depending on whether the first bus master or the second bus master is the current bus master. The burst address logic is for furnishing an initial burst address and subsequent addresses to the addressable data storage in accordance with the burst protocol indicating signal.

A further embodiment of the present invention is a method for selecting burst order for burst data transfers in a computer system between one of a plurality of bus masters and a bus slave. At least one of the bus masters has a first burst order protocol which includes nonsequential burst ordering, while at least another one of the bus masters has a second burst order protocol which includes sequential burst ordering. The method includes arbitrating among the bus masters for current bus master status, and providing a signal indicating the burst order protocol of the bus master having current bus master status. An initial burst address is generated for accessing a data storage in the bus slave. Subsequent addresses are generated for accessing the data storage either in accordance with the first burst order when the burst order signal indicates the first burst order protocol, or in accordance with the second burst order when the signal indicating the burst order signal indicates the second burst order protocol.

DETAILED DESCRIPTION

Figure 1:
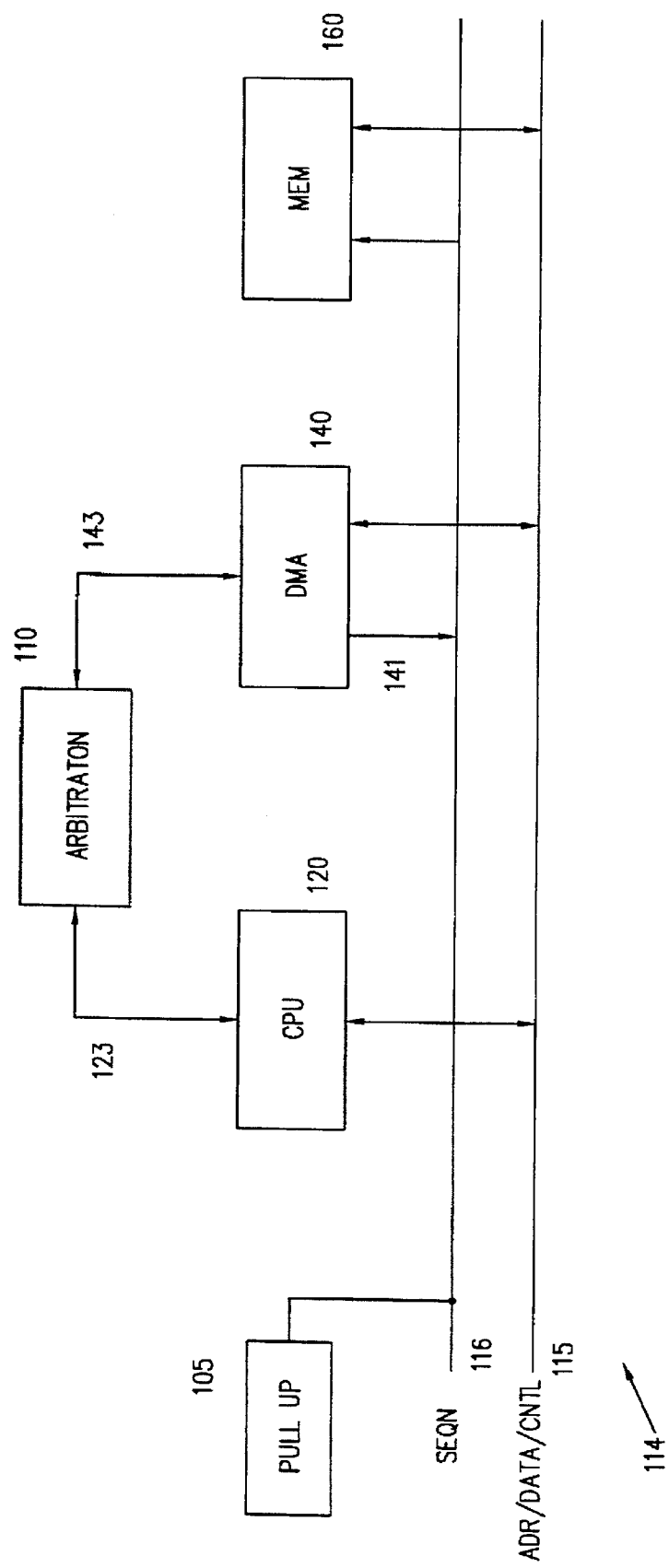
FIG. 1 is a block diagram of a computer system incorporating a bus with selective burst ordering in accordance with the present invention.

FIG. 1 is a block diagram of a part of an illustrative computer system that incorporates a bus with selective burst ordering. Since they are well known in the art, other conventional elements which complete the computer system of FIG. 1 are omitted for clarity. The computer system includes a CPU 120 and a DMA controller 140, each of which may operate as a bus master of a bus 114. Illustratively, the CPU 120 is a Pentium microprocessor. Illustratively, the DMA controller 140 is an interface to a SCSI device such as a hard disk (not shown) or a CD-ROM device (not shown). An arbitration circuit 110 serves to resolve contention for the bus 114 in accordance with any one of a number of well known arbitration schemes. Several suitable arbitration schemes are described in a publication from Intel Corporation entitled i486 Microprocessor Hardware Reference Manual, 1990 (pages 8–16 through 8–21), which is hereby incorporated herein by reference. Typical arbitration schemes include bus request, bus acknowledge, hold request, and hold acknowledge signals (BREQ/BACK and HRQ/HLDA) on lines corresponding to 123 and 143. More complex arbitration schemes are known as well, particularly for use in multi-CPU systems. Simpler arbitration schemes are also possible. For example, HRQ and HLDA lines on a CPU may be directly connected to the corresponding lines on a DMA controller.

The bus 114 shown in FIG. 1 includes traditional address, data, and control lines 115 as well as line 116 for a SEQueNce signal, SEQN. When SEQN is in one state, such as a high state, for example, it indicates that the current bus master transfers data using 486 burst order for implicitly generated addresses. When SEQN is in a low state, it indicates that the current bus master transfers data using sequential burst order. Although the embodiment in FIG. 1 shows a separate SEQN line 116, an unused line provided on bus 115 would also suffice.

The state of the SEQN line 116 may be established in a number of different ways. The SEQN line 116 floats high when not driven to establish the 486 burst order as a default as a result of a pull-up circuit 105 of any conventional design as shown in FIG. 1. Pull-circuit 105 thus generally forms a circuit, referred to herein as a default circuit, for establishing a default logic signal on the SEQN line 116 when it is not being driven by a bus master as described below. The DMA device 140 is connected to the SEQN line 116 over line 141, by which the DMA device 140 drives the SEQN line 116 low when it becomes the current bus master. Alternatively, each bus master may be connected to the SEQN line 116 to drive an appropriate state (high for 486 burst order, low for sequential order) onto the SEQN line 116 when it becomes the current bus master. Alternatively, the state of the SEQN line 116 may be controlled directly from the arbitration circuit 110.

Table 1 shows 486 burst ordering. Note that the order is a function of the initial address alignment (256-bit alignment for the Pentium microprocessor which uses 64-bit words, and 128-bit alignment for the i486 microprocessor which uses 32-bit words). In either case, there are four variations depending on whether the initial transfer address corresponds to the first, second, third, or fourth word within an aligned memory block. For example, if the initial address corresponds to the second data word within the block, non-sequential burst order is second word (1), then first (0), then fourth (3), then third (2). In contrast, sequential burst ordering is simply sequential by memory address.

A memory subsystem 160 responds to data transfer requests in either 486 or sequential burst order depending on the state of SEQN. The following sequence of operations illustrates a i486 microprocessor burst mode memory access. After acquiring the bus 114, the CPU 120 drives the initial transfer address onto the address lines of the bus 115 to read data from the memory 160 in i486 microprocessor burst order. Note that SEQN is high on line 116 by default. The memory subsystem 160 latches the initial address for the burst transfer and proceeds to retrieve data words beginning with the data word addressed by the initial address. The memory subsystem also reads the state of the SEQN line 116 from the bus 114; because SEQN=high, the memory subsystem responds by retrieving subsequent data words in the 486 burst order as specified in Table 1. To accomplish this, the memory subsystem 160 generates each of the implicit addresses (those which follow according to burst order), retrieves the corresponding data word from memory, and drives each data word onto the data lines of the bus 114. Subsequent data words are driven onto the bus 114 in the appropriate i486 microprocessor burst order in accordance with the initial address. The CPU 120 latches data words from the bus 114 as they appear.

Figure 4:
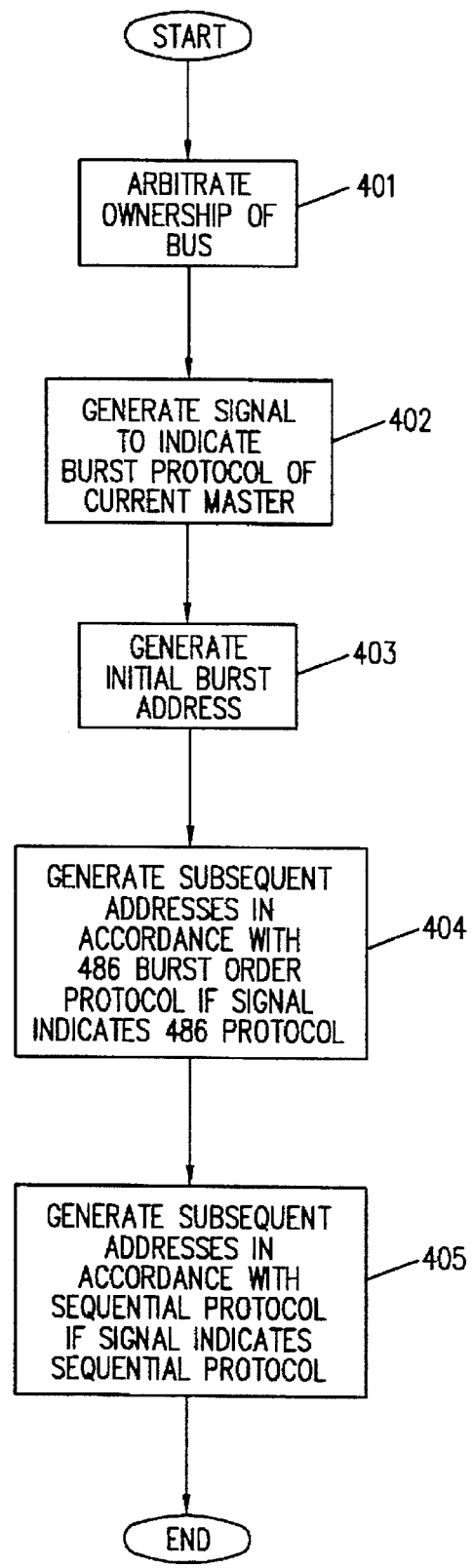
FIG. 4 is a flow diagram which depicts operation of the computer system of FIG. 1.

The following sequence of operations illustrates a sequential memory access. The DMA controller 140 acquires the bus 114 via arbitration circuit 110 and drives SEQN line 116 low. The DMA controller 140 also drives the initial transfer address onto the address lines of the bus 114 for reading data from the memory subsystem 160 in sequential burst mode. The memory subsystem 160 latches the initial address from the bus 114 and reads the state of the SEQN line 16. Because SEQN=low, the memory subsystem 160 generates the implicit addresses in sequential order, retrieves the corresponding data words, and drives each word onto the data lines of bus 114 in sequential burst order. The DMA controller 140 latches data words from the bus 114 as they appear. On completion of the transfer, the DMA controller 140 releases the bus via arbitration circuit 110. FIG. 4 is a flow diagram including steps 401–505 which generally depict the operation of the system of FIG. 1.

The computer system of FIG. 1 supports both single word and burst transfers from memory (reads) and to memory (writes), the basic difference being the direction of data flow between the current bus master (CPU 120 or DMA controller 140) and the memory subsystem 160. In the event that the CPU 140 is a different type of microprocessor such as the i486 microprocessor which supports burst reads but not burst writes, the computer system of FIG. 1 would support single word transfers, burst reads to the CPU 120, and burst transfers to and from the DMA controller 140.

Figure 2:
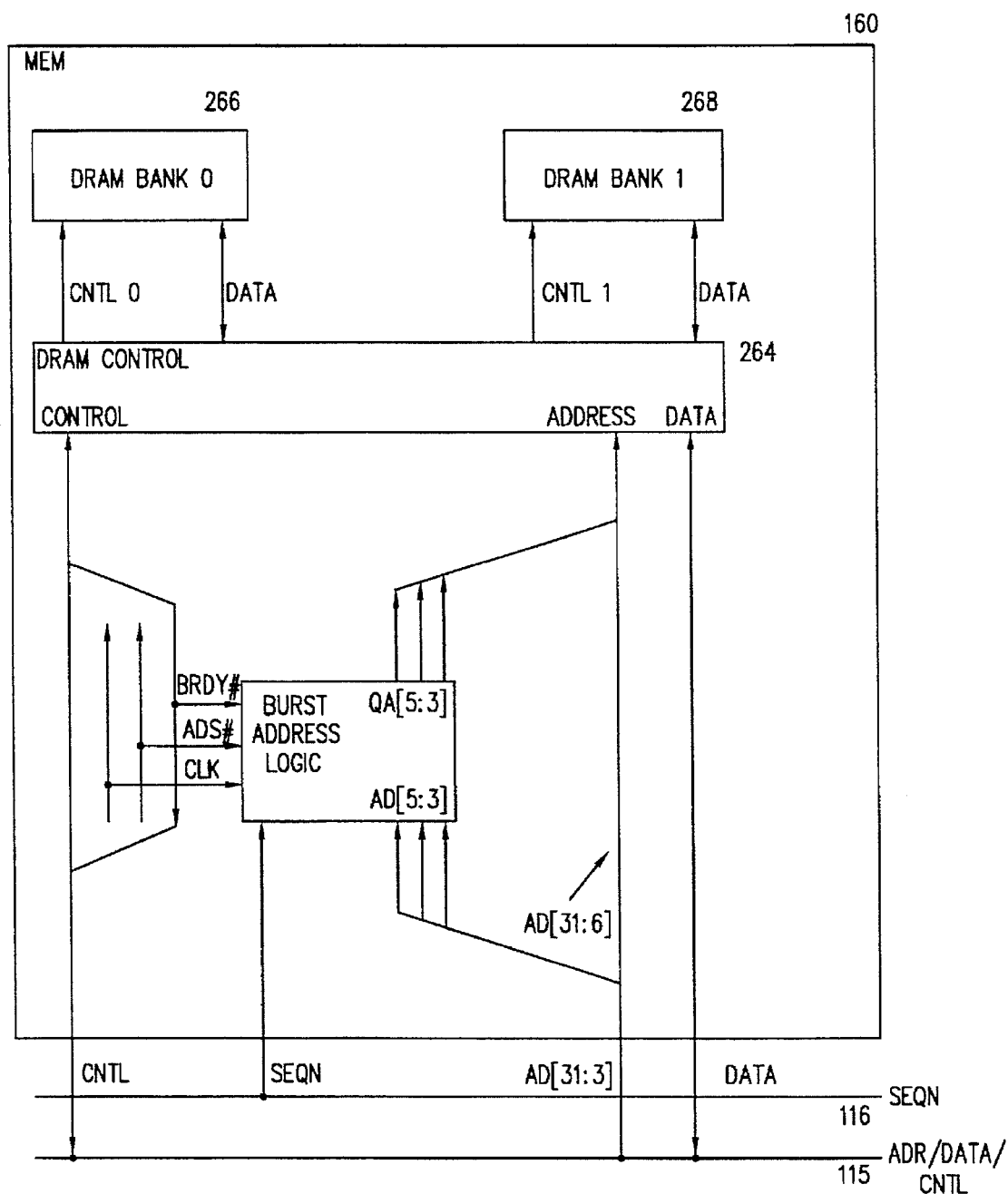
FIG. 2 is a block diagram of a memory subsystem which incorporates implicit address generation logic in accordance with the present invention.
Figure 3:
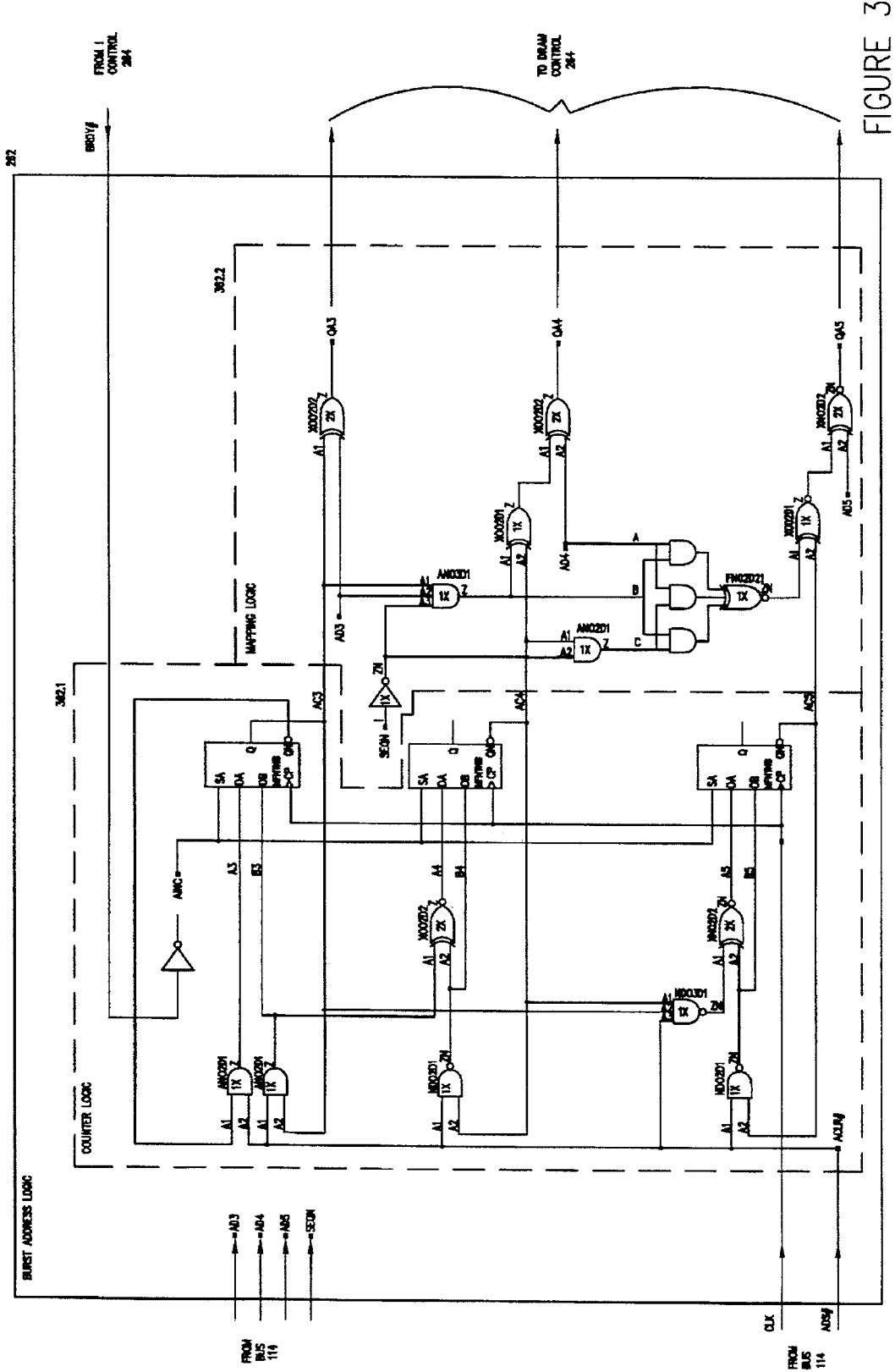
FIG. 3 is a logic diagram for circuitry which selectively generates implicit addresses, either sequentially by memory address or in i486 microprocessor burst order, in accordance with the present invention.

FIGS. 2 and 3 depict the organization and logic of a memory subsystem 160 with selective burst ordering. FIG. 2 shows the relationship of burst address logic 262 to the overall memory subsystem 160. The burst address logic 262 operates within an otherwise conventional interleaved memory subsystem. The DRAM control 264 and interleaved DRAM banks 266 and 268 are of conventional design, organization, and function; see for example, Intel, i486 Microprocessor Hardware Reference Manual, 1990, pp. 5-37 through 5-51. The DRAM control 264 takes a memory address and generates column and row addresses, strobes, timing signals, and other controls necessary to read or write data to or from the correct DRAM cells. Interleaving is traditional, i.e., even data words (address=x0) are stored in the first bank 266 and even data words (address=x1) are stored in the second bank 268. Although an interleaved, DRAM-based memory represents an efficient, cost effective design for high bandwidth memory subsystems, selective burst ordering is applicable to the general class of addressable data storage subsystems and is not limited to an interleaved organization, to a DRAM implementation, or to random access memory.

During a data transfer to or from the memory subsystem 160, burst address logic 262 reads the SEQN signal on line 116 to determine whether sequential or nonsequential burst ordering is selected by the current bus master. Burst address logic 262 generates the sequence of implicit low order address bits QA[5:3] for use by the DRAM control 264. The DRAM control 264 combines the low-order implicit address bits generated by the burst address logic with higher order bits latched directly from the address lines AD[31:6] of the bus 114. Burst address logic 262 presents a new set of low order address bits, QA[5:3], in each of the subsequent burst cycles. The order in which bit patterns are generated depends on whether sequential or i486 microprocessor burst order is selected.

FIG. 3 shows the burst address logic 262 in further detail. The burst address logic 262 includes counter logic 362.1 and mapping logic 362.2. At a top level, the burst address logic 262 operates by combining the low-order bits of the initial burst address, AD[5:3] with the value output by the counter logic 362.1, AC[5:3]. Mapping logic 362.2 performs either a simple addition of the two bit patterns (sequential burst mode) or a mapping of the combined patterns to i486 microprocessor burst order depending on the value of SEQN. The mapped result, QA[5:3] is passed on to DRAM control 264 as the low order bits of the memory address. The counter 362.1 is incremented each bus cycle; as a result, the mapped low-order address bits, QA[5:3] are stepped either sequentially or in i486 microprocessor burst sequence. The three-bit counter logic 362.1 depicted in FIG. 3 supports bursts transfers of up to eight data words (512 bits for a computer system based on the Pentium microprocessor), although the counter logic 362.1 could be modified to accommodate other burst lengths and other word lengths.

The BRDY# signal, Burst ReaDY (active low), is also a part of the interface between the DRAM control 264 and burst address logic 262. Each time the DRAM control 264 asserts BRDY#, the counter 362.1 is incremented. As a result, the low-order address bits, QA[5:3] output by the mapping logic 362.2 are stepped according to the selected burst order. BRDY# is a standard signal defined by both the Pentium microprocessor and i486 microprocessor architectures and is typically driven by DRAM controllers designed for burst transfers. For non-burst transfers, BRDY# is not asserted. As a result, counter 362.1 is not incremented and the burst address logic simply passes the low-order address bits A[5:3] to the DRAM control 264 as QA[5:3].

FIG. 3 also indicates the standard control signals taken off bus 114 as inputs to the burst address logic. ACLR#, Address CLeaR (active low), is the internal signal used to clear the counter logic 362.1. Because the Pentium microprocessor (and i486 microprocessor) bus signal ADS#, ADdress Strobe (active low), is asserted at the start of each burst (or non-burst transfer), ACLR# is tied to ADS#. This ensures that the counter 362.1 is reset at the beginning of each data transfer. Similarly, the clock signal, CLK, is taken directly off the bus so that burst address logic is synchronized with bus timing.

FIG. 3 depicts the low-order bits AD[5:3] of the address lines as inputs to the mapping logic 362.2. These low order bits can be latched from the address lines of the bus 114 when the initial burst address is presented on the bus. Latching is necessary to support i486 microprocessor bus addressing protocols, since the i486 microprocessor specification calls for the processor to write subsequent burst addresses to the address bus (see Intel, i486™ Microprocessor Hardware Reference Manual, 1990, p. 8–11, FIG. 8—8). The Pentium microprocessor specification no longer calls for the processor to post subsequent burst addresses on the data bus, so that latching is not necessary to support the Pentium microprocessor bus addressing protocols unless pipelining is enabled.

The counter logic 362.1 operates as follows. An array of three DQ flip-flops stores the state of the counter. All three flip flops are clocked by the CLK signal from bus 114 (for synchronization) although state changes actually occur on each assertion of BRDY# by the DRAM control 264. The Q output of each flip-flop is recycled as the input QB to each flip-flop. Each of the QB inputs is ANDed with the ADS# from bus 114 to implement a clear signal. If BRDY# is asserted, the logic value presented at the QA input is clocked into the flip flop; otherwise the QB input is used. Combinatorial logic which precedes the QA inputs implements the carry propagation of a simple counter. As a result, each time BRDY# is asserted, the counter is incremented. Counter logic 362.1 counts in sequence from 000 (0) to 111 (7). The counter is designed to minimize gate delays in front of the SA inputs to the flip-flops.

The mapping logic 362.2 operates as follows. Two bit patterns, AD[5:3] and AC[5:3] are combined by the mapping logic to produce the low-order burst address bits, QA[5:3]. When the SEQueNtial burst order signal, SEQN, is asserted (active low), the combinatorial logic adds the outputs of the counter, AC[5:3], to the low-order address bits, AD[5:3], latched from bus 115. When SEQN is unasserted, the combinatorial logic maps the sum of AD[5:3] and AC[5:3] into the low order bits specified by 486 burst order.

Numerous modifications and variations will become apparent to those skilled in the art once the above disclosure is fully appreciated. For example, additional counter cells and modifications to the mapping logic would allow longer data burst runs. Moreover, the teachings of the present invention apply to bus structures at various levels in a hierarchy of buses (i.e., memory bus, local bus, system-wide bus, etc.). Although the above embodiment is based on a 64-bit data word, modifications may be made to support alternate data word sizes. System applications incorporating more than two bus masters are also envisioned. It is to be understood that the above embodiment is intended to be merely illustrative of the spirit and scope of the invention and should not be taken in a limiting sense. The scope of the claimed invention is defined with reference to the following claims.

What is claimed is:

1. A computer subsystem for supporting burst data transfers, comprising:

a bus;

a first bus master connected to the bus, the first bus master having a first burst order protocol characterized by non-sequential burst ordering;

a second bus master connected to the bus, the second bus master having a second burst order protocol wherein burst ordering is sequential;

a control line for carrying a burst protocol indicating signal for indicating one of the first and second burst order protocols depending on which one of the first and second bus masters is a current bus master; and a bus slave connected to the bus, the bus slave having addressable data storage and further having burst address logic connected to the control line for furnishing an initial burst address and subsequent addresses to the addressable data storage in accordance with the burst protocol indicating signal on the control line.

2. A computer subsystem as in claim 1 wherein:

the first burst order protocol is a 486 burst order protocol.

3. A computer subsystem as in claim 2 wherein the bus slave is an interleaved memory subsystem.

4. A computer subsystem as in claim 3 wherein the interleaved memory is DRAM memory.

5. A computer subsystem as in claim 1 wherein the first bus master is connected to the control line for providing said burst protocol indicating signal thereon indicating the first burst order protocol when the first bus master is the current bus master, and wherein the second bus master is connected to the control line for providing said burst protocol indicating signal thereon indicating the second burst order protocol when the second bus master is the current bus master.

6. The computer subsystem as in claim 1 wherein said control line is connected to at least one of the first and second bus masters.

7. The computer subsystem as in claim 1 wherein burst ordering of said second burst order protocol is always sequential.

8. The computer subsystem as in claim 1 wherein said at least one of said first and second bus masters is configured to generate said burst protocol indicating signal.

9. A computer subsystem for supporting burst data transfers, comprising:

a host bus;

a first bus master connected to the host bus, the first bus master being a microprocessor having a 486 burst order protocol;

a second bus master connected to the host bus, the second bus master being a DMA controller having a sequential burst order protocol;

an arbitration control unit connected to the first bus master to the second bus master for selecting one of the first and second bus masters as a current bus master;

a burst order line for carrying a burst order signal indicating one of either the 486 burst order protocol or the sequential burst order protocol depending on which one of the first and second bus masters is the current bus master;

a default circuit connected to the burst order line for providing a default burst order signal to the burst order line indicative of the 486 burst order protocol when the first bus master is the current bus master, the second bus master being connected to the burst order line for providing said burst order signal thereon indicating the second burst order protocol when the sequential bus master is the current bus master; and a bus slave connected to the bus, the bus slave having a memory and further having burst address logic connected to the burst order line for furnishing an initial burst address and subsequent addresses to the memory in accordance with the burst order signal.

10. A method for selecting burst order for burst data transfers in a computer system between one of a plurality of bus masters connected to a bus and a bus slave connected to said bus, the plurality of bus masters comprising at least one bus master with a first burst order protocol characterized by non-sequential burst ordering and at least one bus master with a second burst order protocol characterized sequential burst ordering, and the bus slave having addressable data storage, the method comprising the steps of:

arbitrating among the bus masters for current bus master status;

providing a signal indicating the burst order protocol of the bus master having current bus master status;

generating an initial burst address for accessing the data storage;

generating subsequent addresses for accessing the data storage in accordance with the first burst order when the signal indicating the burst order protocol of the bus master having current bus master status indicates the first burst order protocol; and generating subsequent addresses for accessing the data storage in accordance with the second burst order when the signal indicating the burst order protocol of the bus master having current bus master status indicates the second burst order protocol.

11. A method as in claim 10 wherein:

the first burst order protocol is a 486 burst order protocol; and the second burst order protocol is a sequential burst order protocol.

12. A computer subsystem for supporting burst data transfers, comprising:

a bus;

a first bus master connected to the bus, the first bus master having a first burst order protocol characterized by non-sequential burst ordering;

a second bus master connected to the bus, the second bus master having a second burst ordering is sequential;

a control line for carrying a burst protocol indicating signal for indicating one of the first and second burst order protocols depending on which one of the first and second bus masters is a current bus master;

a bus slave connected to the bus, the bus slave having addressable data storage and further having burst address logic connected to the control line for furnishing an initial burst address and subsequent addresses to the addressable data storage in accordance with the burst protocol indicating signal on the control line; and a default circuit connected to said control line for providing a default burst order signal to the control line, wherein one of the first and second bus masters is not connected to the control line and the other of the first and second bus masters is connected to the control line, the default burst order signal being indicative of a burst order protocol of the bus master which is not connected to the control line.

13. The computer subsystem as in claim 12 wherein said control line is connected to at least one of the first and second bus masters.

14. The computer subsystem as in claim 12 wherein burst ordering of said second burst order protocol is always sequential.

15. The computer subsystem as in claim 12 wherein said at least one of said first and second bus masters is configured to generate said burst protocol indicating signal.

16. A computer subsystem for supporting burst data transfers, comprising:

a bus;

a first bus master connected to the bus, the first bus master having a first burst order protocol characterized by non-sequential burst ordering;

a second bus master connected to the bus, the second bus master having a second burst ordering is sequential;

a control line for carrying a burst protocol indicating signal for indicating one of the first and second burst order protocols depending on which one of the first and second bus masters is a current bus master;

a bus slave connected to the bus, the bus slave having addressable data storage and further having burst address logic connected to the control line for furnishing an initial burst address and subsequent addresses to the addressable data storage in accordance with the burst protocol indicating signal on the control line; and a default circuit connected to the control line for providing a default burst order signal to the control line indicative of the first burst order protocol when the first bus master is the current bus master, and wherein the second bus master is connected to the control line for providing said burst order indication signal thereon indicating the second burst order protocol when the second bus master is the current bus master.

17. The computer subsystem as in claim 16 wherein said control line is connected to at least one of the first and second bus masters.

18. The computer subsystem as in claim 16 wherein burst ordering of said second burst order protocol is always sequential.

19. The computer subsystem as in claim 16 wherein said at least one of said first and second bus masters is configured to generate said burst protocol indicating signal.

20. A computer subsystem for supporting burst data transfers, comprising:

a bus;

a first bus master connected to the bus, the first bus master having a first burst order protocol characterized by non-sequential burst ordering;

a second bus master connected to the bus, the second bus master having a second burst ordering is sequential;

a control line for carrying a burst protocol indicating signal for indicating one of the first and second burst order protocols depending on which one of the first and second bus masters is a current bus master; and a bus slave connected to the bus, the bus slave having addressable data storage and further having burst address logic connected to the control line for furnishing an initial burst address and subsequent addresses to the addressable data storage in accordance with the burst protocol indicating signal on the control line wherein the bus slave includes a controller for controlling burst accesses to the data storage and for providing a burst ready signal incident thereto, and wherein the bus includes low order address bits, the burst address logic comprising:

counter logic connected to the controller for advancing a count in response to the burst ready signal, the count being furnished on an output of the counter logic; and mapping logic having an input connected to the output of the counter logic and inputs receiving the low order address bits for combing counts from the counter logic and low order addresses represented by the low order address bits to obtain low order burst addresses conforming to the first burst order protocol if the burst order indicating signal indicated said first burst order protocol and conforming to the second burst order protocol indicating signal indicated said second burst order protocol.

21. The computer subsystem as in claim 20 wherein said control line is connected to at least one of the first and second bus masters.

22. The computer subsystem as in claim 20 wherein burst ordering of said second burst order protocol is always sequential.

23. The computer subsystem as in claim 20 wherein said at least one of said first and second bus masters is configured to generate said burst protocol indicating signal.

* * * * *